(12) United States Patent
Filler

(10) Patent No.: US 9,367,069 B2
(45) Date of Patent: Jun. 14, 2016

(54) PNEUMATIC LEVEL SWITCH

(71) Applicant: KIMRAY, INC., Oklahoma City, OK (US)

(72) Inventor: William David Filler, Yukon, OK (US)

(73) Assignee: KIMRAY, INC., Oklahoma City, OK (US)

( * ) Notice: Subject to any disclaimer, the term of this patent is extended or adjusted under 35 U.S.C. 154(b) by 237 days.

(21) Appl. No.: 14/019,097

(22) Filed: Sep. 5, 2013

(65) Prior Publication Data
US 2014/0076425 A1  Mar. 20, 2014

Related U.S. Application Data

(60) Provisional application No. 61/794,513, filed on Mar. 15, 2013, provisional application No. 61/701,294, filed on Sep. 14, 2012.

(51) Int. Cl.
| *F16K 31/34* | (2006.01) |
| *F16K 31/365* | (2006.01) |
| *G05D 16/06* | (2006.01) |
| *F16K 31/52* | (2006.01) |
| *F16K 31/08* | (2006.01) |

(52) U.S. Cl.
CPC ............. *G05D 16/06* (2013.01); *F16K 31/086* (2013.01); *F16K 31/34* (2013.01); *F16K 31/52* (2013.01); *Y10T 137/7762* (2015.04); *Y10T 137/8593* (2015.04)

(58) Field of Classification Search
CPC ......... G05D 16/06; F16K 31/34; F16K 31/52; Y10T 137/7762; Y10T 137/2544; Y10T 137/8593; Y10T 137/7768; Y10T 137/7365; Y10T 137/87185; Y10T 137/87193
USPC ................... 137/488, 102, 411, 489.5, 492.5, 137/596.14, 596.13; 251/231; 277/634
See application file for complete search history.

(56) References Cited

U.S. PATENT DOCUMENTS

| 1,342,874 | A | * | 6/1920 | Sessions | .................. F02M 1/00 137/263 |
| 2,043,530 | A | * | 6/1936 | Dezotell | ................. G01F 23/36 200/84 R |
| 2,217,537 | A | * | 10/1940 | Carlstedt | ................. F16J 15/52 137/412 |
| 2,355,758 | A | * | 8/1944 | Stevens | ............ F16K 31/52408 137/102 |
| 2,504,816 | A | * | 4/1950 | De Ville | .................... C02F 1/42 137/410 |
| 2,596,666 | A | * | 5/1952 | Edgar | ...................... F16J 15/52 200/84 R |
| 2,625,168 | A | * | 1/1953 | Charlson | ................... C02F 1/42 137/102 |
| 2,626,594 | A | * | 1/1953 | Kimmell | ................. E21B 43/34 137/412 |
| 3,209,297 | A | * | 9/1965 | Kmiecik | ................. G01F 23/38 200/84 C |
| 3,860,028 | A | | 1/1975 | Moore et al. | |

(Continued)

OTHER PUBLICATIONS

Ruelco, Pneumatic 2" NPT Level Switch 30C2, Brochure, mfg'd under U.S. Pat. No. 4,838,303, US, undated but admitted to be prior art.

(Continued)

*Primary Examiner* — Kevin Murphy
*Assistant Examiner* — Minh Le
(74) *Attorney, Agent, or Firm* — McAfee & Taft, PC

(57) ABSTRACT

A pneumatic switch is provided for the pneumatic control of process control components, such as valves and compressors. The pneumatic switch utilizes a slide bar operationally connected to a waggle arm to control valves, which control the introduction of compressed gas to the process control components.

18 Claims, 10 Drawing Sheets

(56) References Cited

U.S. PATENT DOCUMENTS

| | | | | |
|---|---|---|---|---|
| 3,963,888 A | * | 6/1976 | Riede | H01H 35/027 200/61.48 |
| 3,970,099 A | | 7/1976 | Murphy, Jr. et al. | |
| 4,481,389 A | | 11/1984 | Johnson | |
| 4,505,288 A | | 3/1985 | Murphy, Jr. et al. | |
| 4,542,765 A | | 9/1985 | Glascow et al. | |
| 4,573,489 A | | 3/1986 | Carlton et al. | |
| 4,577,657 A | * | 3/1986 | Alexander | F16K 31/086 137/448 |
| 4,637,431 A | * | 1/1987 | Taplin | F15B 13/0405 137/596.15 |
| 4,838,303 A | | 6/1989 | Goans | |
| 5,094,260 A | * | 3/1992 | Stuart | G05D 16/202 137/102 |
| 5,191,912 A | * | 3/1993 | McDaniel | F16K 31/34 137/270 |
| 5,638,859 A | * | 6/1997 | Thomson | F16K 31/34 137/414 |
| 5,707,066 A | * | 1/1998 | Sugiura | F16J 3/042 277/634 |
| 5,833,542 A | * | 11/1998 | Harrold | B29C 66/1122 156/272.4 |
| 6,406,034 B1 | * | 6/2002 | Alcantara | F16J 3/046 138/89 |
| 6,584,999 B2 | | 7/2003 | Inayama | G05D 16/2093 137/102 |
| 6,779,541 B2 | * | 8/2004 | Inayama | G05D 16/2093 137/102 |
| 7,097,568 B2 | * | 8/2006 | Kuczera | F16D 3/845 277/634 |
| 7,249,610 B2 | * | 7/2007 | Moses | F23D 14/60 137/488 |
| 8,397,742 B2 | * | 3/2013 | Thrash | F16K 11/044 137/111 |
| 8,967,180 B2 | * | 3/2015 | Yamauchi | G05D 16/163 137/116.3 |
| 9,092,038 B2 | * | 7/2015 | Schuler | F16K 11/161 |
| 2005/0051972 A1 | * | 3/2005 | Wang | F16D 3/845 277/634 |
| 2006/0088429 A1 | * | 4/2006 | Pfieffer | G01F 23/34 417/572 |
| 2007/0095401 A1 | * | 5/2007 | Webster | F16K 17/10 137/488 |
| 2007/0246101 A1 | | 10/2007 | Kimmell | |
| 2009/0115142 A1 | * | 5/2009 | Kuczera | B29C 73/22 277/634 |
| 2010/0071784 A1 | | 3/2010 | Gentry | |
| 2010/0295256 A1 | * | 11/2010 | Nakajima | F16D 3/223 277/634 |
| 2012/0060941 A1 | * | 3/2012 | Roman | F16K 3/246 137/488 |
| 2012/0267559 A1 | * | 10/2012 | Moretz | F16J 15/061 251/316 |
| 2015/0260307 A1 | * | 9/2015 | Chen | F16K 27/044 251/231 |

OTHER PUBLICATIONS

K-Dyne, Inc. Model L80 Pneumatic, Brochure, undated, but admitted to be prior art.

Linc Milton Roy, Instruction Manual—Level Control Switches, Linc 282 & 272SC Series, Copyright 2004 Milton Roy USA.

FW Murphy, Level Controls for Scrubbers (brochure), L12-9102B, Catalog section 15, Revised Aug. 2005.

Carpenter Technical, Magnetic Properties of Stainless Steel, Article, http://www.cartech.com/techarticles.aspx?id=1476, Mar. 14, 2013.

FW Murphy, LS200, LS200N, LS200NDVOR Series and L1100 Liquid Level Switches, Installation and Operations Manual, 00-02-0671, Section 15, Sep. 15, 2008.

Wellmark Cemco Major, W1200 DVO Low Bleed Pneumatic Liquid Level Control, Brochure and Specifications, The WellMark Company, WMW1200DVO-11/10, Section No. 3.10, Litho USA, Copyright 2011.

Kenco Engineering, KPFS Pneumatice Float Switch, Brochure and Specifications, Oct. 26, 2011.

International Search Report and Written Opinion of the International Searching Authority dated Apr. 9, 2014, filed in corresponding PCT Application No. PCT/US2013/058291.

* cited by examiner

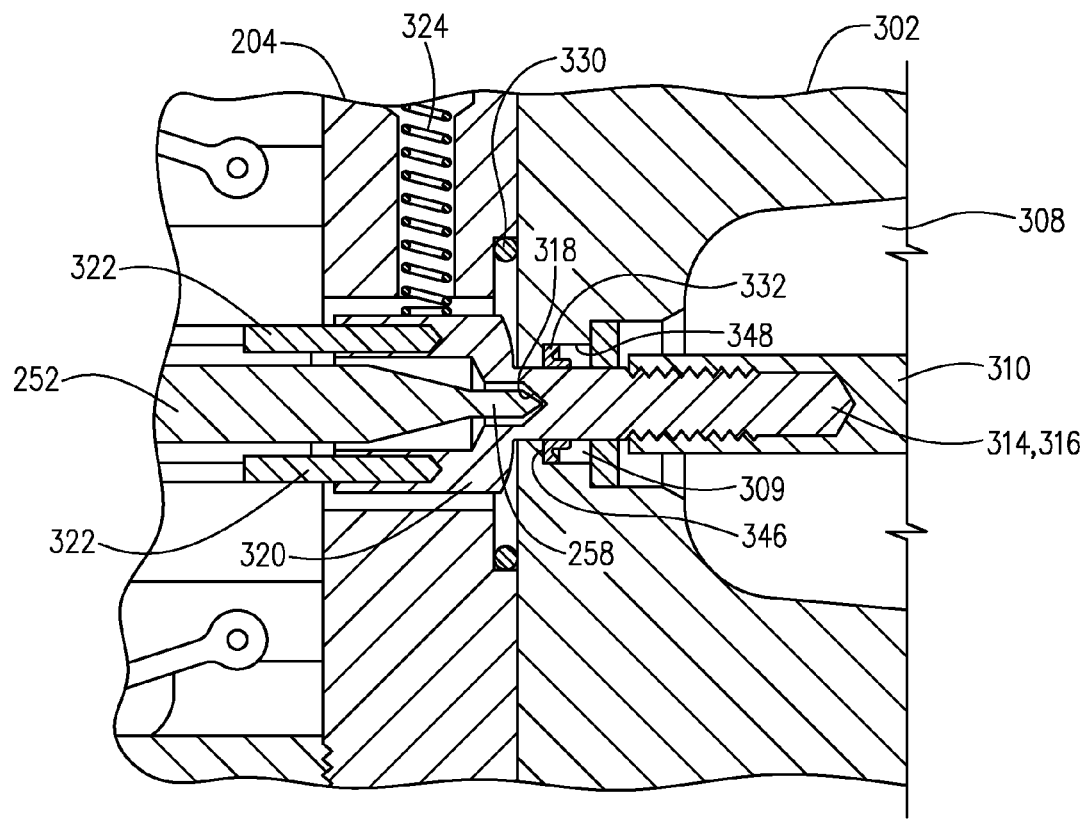
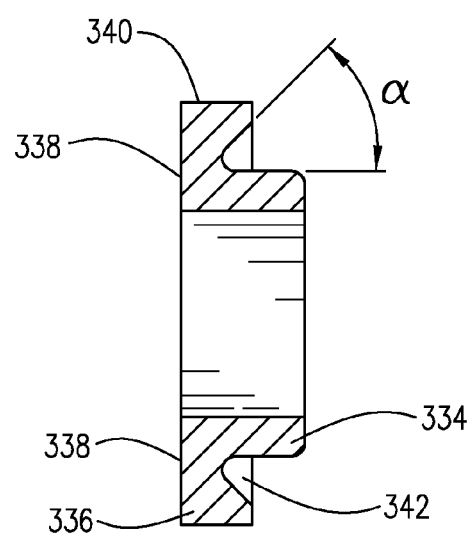

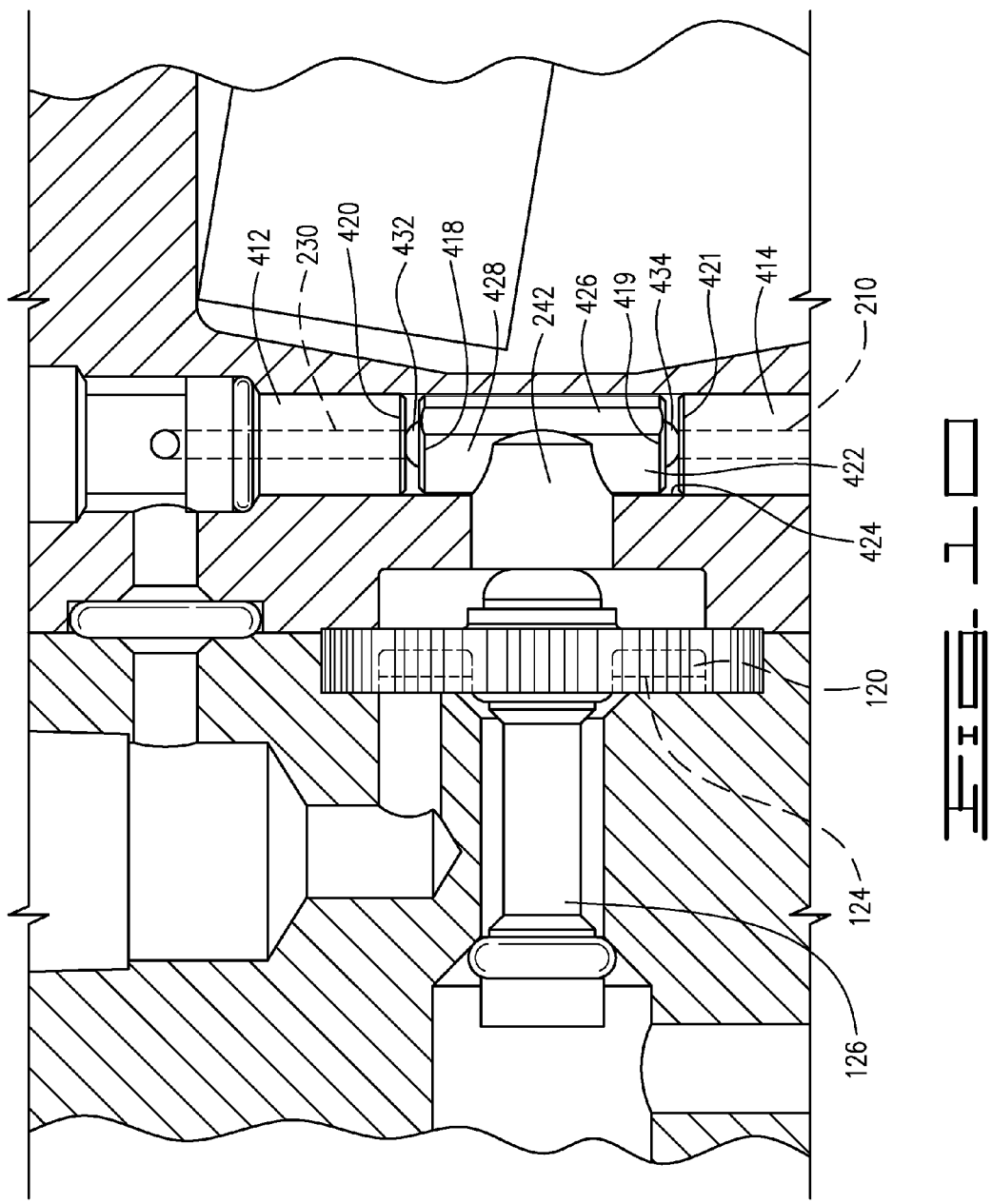

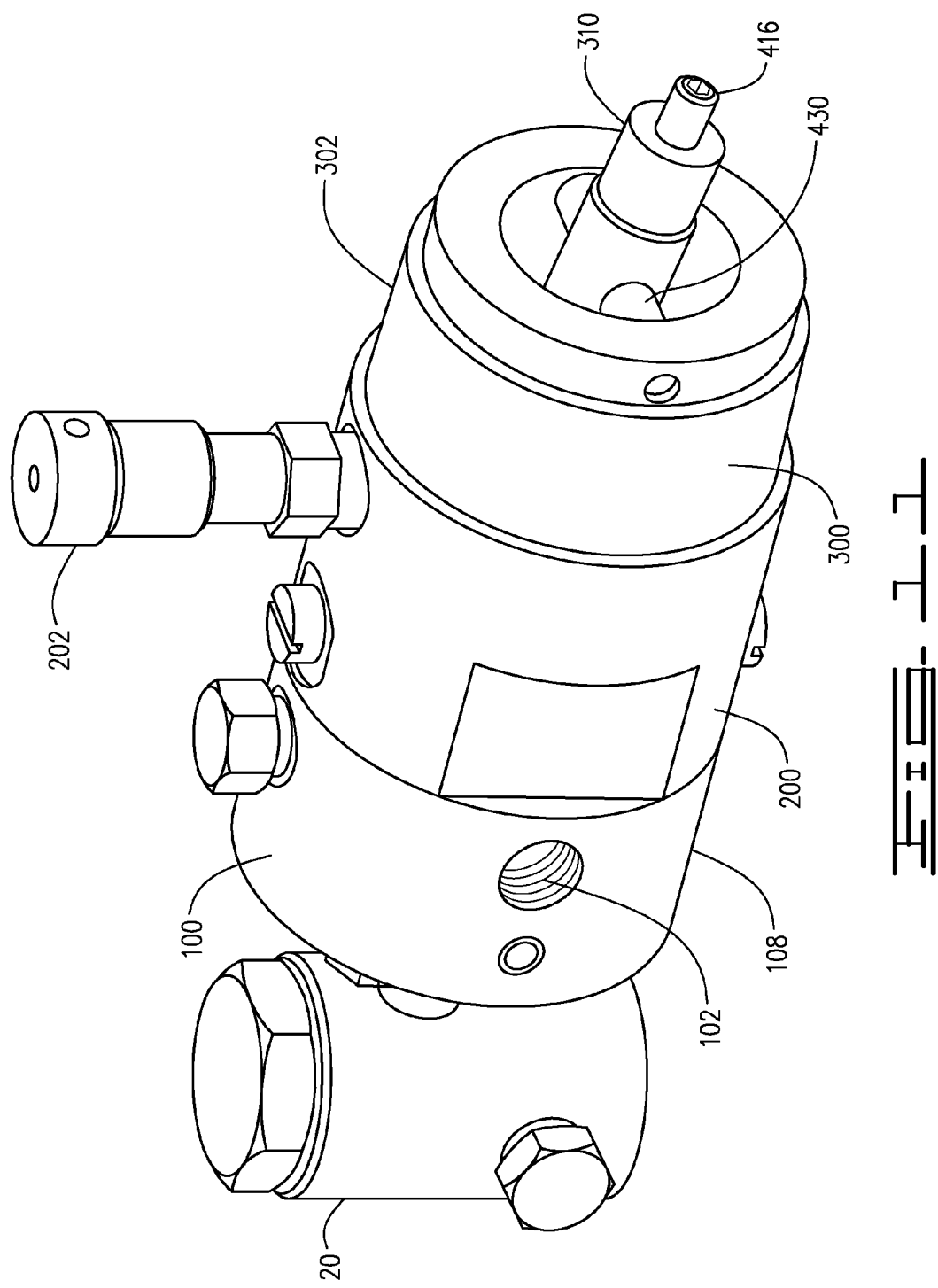

PNEUMATIC LEVEL SWITCH

CROSS-REFERENCE TO RELATED APPLICATIONS

This application incorporates by reference and claims the benefit of U.S. Provisional Application No. 61/701,294 filed Sep. 14, 2012, and U.S. Provisional Application No. 61/794,513 filed Mar. 15, 2013.

BACKGROUND OF THE INVENTION

1. Field of the Invention

This invention relates generally to pneumatic controls and more particularly to pneumatic switches and has particular application to pneumatic level switches.

2. Description of the Related Art

Pilot valves are used in a number of different industries, typically to control process conditions or parameters, by controlling the operation of a process control unit, such as a process control valve. Numerous industries utilize process control valves to control the rate of flow of liquid and to control the level of liquid in tanks and vessels. The process control valves in many cases are operated with a control signal, which may be, for example, a pneumatic signal transmitted from a pilot valve. In such a case, the liquid level in a tank or other vessel may be sensed by a liquid level controller, such as a float, displacer or other element, which moves when the liquid reaches a certain level. Movement of the float will actuate a control device, such as a pilot valve, which will send a signal to the process control valve to open or close the process control valve to either allow flow of liquid from the vessel or to prevent flow therefrom.

In the oil and gas industry, liquid level controllers (called a float hereinafter) may be used to control the level of oil, water or other liquids in a tank or other vessel. The float is placed inside the tank. When the liquid level in the tank is such that it engages the float, the float will move as the level of the liquid changes. The changes in the liquid level are transmitted to a pilot valve which will signal the process control valve to either open or close in response to the changing liquid level in the tank which will either allow flow to or stop flow from the tank.

The pilot valve may be a pneumatic pilot valve to which a supply gas is provided. The pilot valve will direct the supply gas to the process control valve depending upon the level of liquid in the tank and the process control valve will open or close depending on the signal received from the pilot valve.

In one type of pilot valve, the pilot valve provides a sudden increase in output pressure, or a sudden decrease, to the process control valve so that the control valve will open fully, or close fully, almost immediately. For example, when the level of liquid in the tank increases and moves the displacer to a predetermined level, there will be a sudden increase in output pressure from the pilot valve, which will cause the process control valve to move almost immediately from the fully closed to a fully open position to discharge liquid from the tank. When the liquid level falls to a preselected lowermost level, a sudden decrease in output pressure from the pilot valve will occur; this will cause the process control valve to move from the fully open to the fully closed position.

While there are several different pneumatic switches using pilot valves to actuate process control valves, there is a continuing need for new and different pneumatic switches to serve the various needs of industry.

SUMMARY OF THE INVENTION

In accordance with one embodiment of the invention, there is provided a pneumatic switch. The switch comprises a diaphragm valve, which is actuated when the pressure in a gas chamber exceeds a predetermined pressure level. The switch also comprises a set of components that interact to actuate the diaphragm valve. The components include a switch assembly, a slide bar, a first and second gas conduit, and a first and second valve associated with the first and second gas conduit, respectively. The switch assembly is moveable along a line from a first apex position to a second apex position. The slide bar is operationally connected to the switch assembly such that movement of the switch assembly from the first apex position to the second apex position moves the slide bar between a first position to a second position. The first valve has an open position that allows fluid flow through the first gas conduit and a closed position that prevents fluid flow through the first gas conduit. When the first valve is in the open position, the first gas conduit is in fluid flow communication with a gas source and the gas chamber and, thus, receives pressurized gas at a pressure above the predetermined pressure level from the gas source and introduces the pressurized gas into the gas chamber to thus actuate the diaphragm valve. The second valve has an open position that allows fluid flow through the second gas conduit and a closed position that prevents fluid flow through the second gas conduit. When the second valve is in the open position, the second gas conduit is in fluid flow communication with the gas chamber and vents the gas from the gas chamber such that the pressure in the gas chamber is below the predetermined pressure level. Additionally, the first valve and second valve are operationally connected to the slide bar such that, when the slide bar is in the first position, the first valve is in the closed position and the second valve is in the open position and, when the slide bar is in the second position, the first valve is in the open position and the second valve is in the closed position.

In another embodiment of the invention, there is provided a pneumatic level switch comprising a pilot valve assembly, an actuator body, a slide bar, a first valve and a second valve. The pilot valve assembly has a gas supply inlet, an output gas outlet and a vent gas outlet. The pilot valve assembly has a first position in which the gas supply inlet is not in fluid flow communication with the gas supply outlet and the vent gas outlet is in fluid flow communication with the gas supply outlet. The pilot valve assembly has a second position in which the gas supply inlet is in fluid flow communication with the gas supply outlet and the gas supply outlet is not in fluid flow communication with the vent gas outlet. The actuator body defines a gas inlet conduit, a bore in fluid flow communication with the gas inlet conduit, a vent gas conduit in fluid flow communication with the bore, and a gas chamber terminating at a first outer side of the actuator body in an actuator port. The gas chamber is in fluid flow communication with the bore and the actuator body and pilot valve assembly are connected such that supplying the gas chamber with a gas above a predetermined pressure level activates the pilot valve assembly to change from the first position to the second position. The slide bar is slidably disposed in the bore and moveable from a first position to a second position. The first valve is disposed in the gas inlet conduit and has a closed position preventing fluid flow through the gas inlet conduit and an open position allowing fluid flow through the gas inlet conduit. The second valve is disposed in the vent gas conduit and has a closed position preventing fluid flow through the vent gas conduit and an open position allowing fluid flow through the vent gas conduit.

In a further embodiment of the invention, there is provided a process for providing output gas to a process control component in response to a change of fluid level in a tank from a first level to a second level. The process comprises the steps of:

(a) introducing a gas at a pressure above a predetermined pressure level into a diaphragm valve;

(b) moving a slide bar from an initial position to a secondary position in response to the fluid level in the tank changing from the first level to the second level;

(c) moving a first valve from a closed position to an open position in response to the movement of the slide bar in step (b);

(d) moving a second valve from an open position to a closed position in response to the movement of the slide bar in step (b) wherein the second valve and first valve are moved simultaneously; and (e) actuating a diaphragm valve in response to steps (c) and (d) such that the gas is provided to the process control component.

In yet another embodiment of the invention, there is provided a pneumatic level switch of the type comprising an actuator assembly having an interior, an exterior and a waggle arm extending from the interior of the actuator assembly to the exterior of the actuator assembly. The pneumatic level switch comprises a boot seal having a j-shaped cross section comprising an elongated member ending in a lip. The elongated member engages the waggle arm and the boot seal provides a fluid tight seal between the interior and the exterior of the actuator assembly.

BRIEF DESCRIPTION OF THE DRAWINGS

FIG. 6 is an enlargement of the waggle arm and pivot rod engagement section of the cross-sectional view of FIG. 2. FIG. 6 illustrates an alternative embodiment for the seal ring between the waggle arm and bore.

FIG. 7 is a cross-sectional view of the seal ring illustrated in FIG. 6.

FIG. 9 is an enlarged cross-sectional view of the actuator assembly of the embodiment of FIG. 8.

FIG. 10 is an enlarged cross-sectional view of the slide bar of the embodiment of FIG. 8.

DESCRIPTION OF THE PREFERRED EMBODIMENTS

Figure 1:
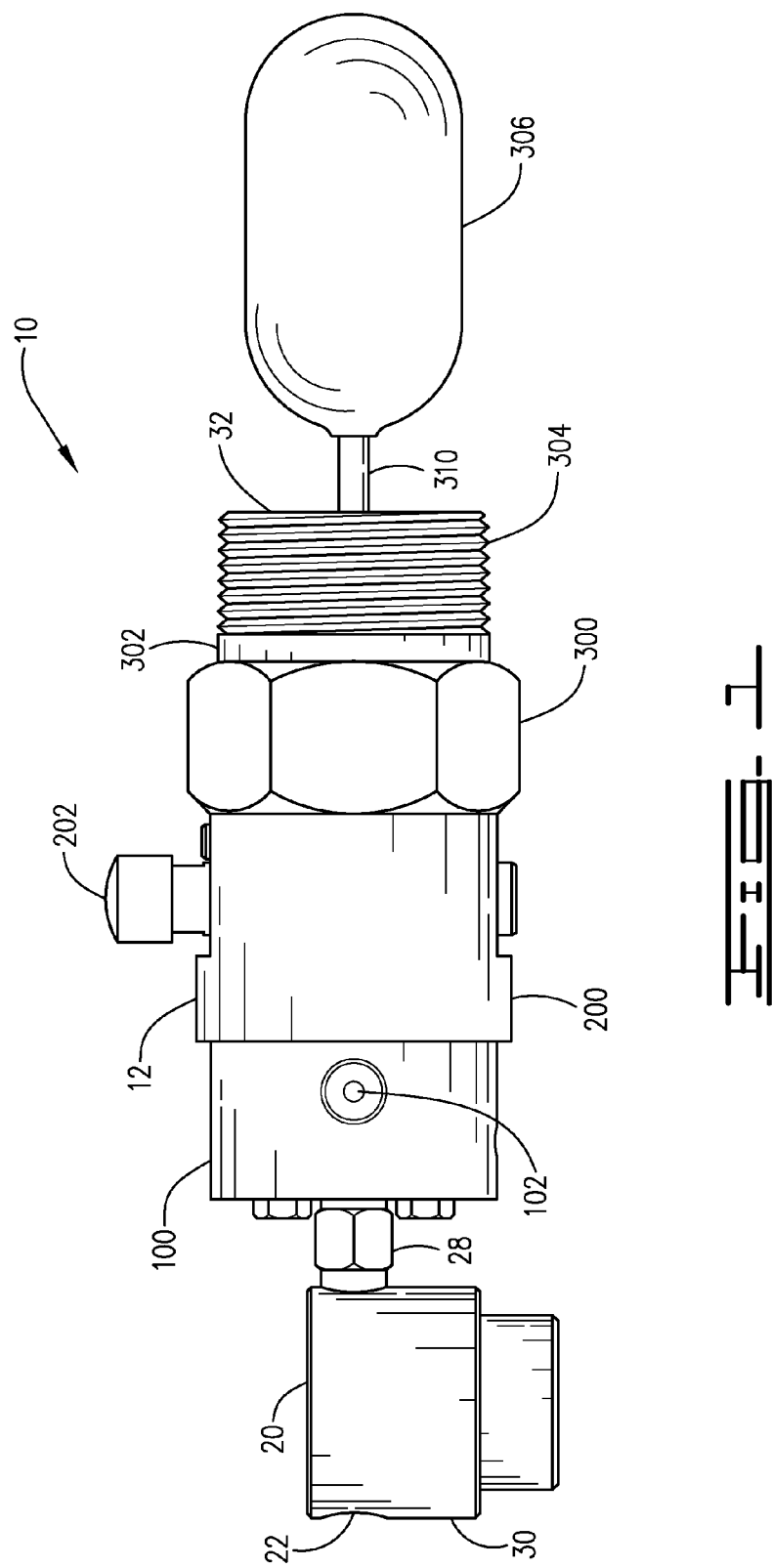
FIG. 1 is an elevation view of a pneumatic switch in accordance with one embodiment of the current invention.

Referring now to the drawings, wherein like numerals designate like parts throughout the various views, various embodiments are illustrated and described. The drawings are not necessarily to scale and the proportions of certain parts have been exaggerated to better illustrate details and features of the invention. Where components of relatively well-known designs are employed, their structure and operation will not be described in detail.

In FIGS. 1-6, a pneumatic switch 10 in accordance with one embodiment of the invention is shown and described. As shown in FIG. 1, pneumatic switch 10 is a pneumatic level switch and generally comprises a sturdy housing or body portion 12 formed of brass, stainless steel, or the like. Housing 12 further comprises a pilot valve assembly 100, an actuator assembly 200, and a switch assembly (shown as waggle arm assembly 300). Pilot valve assembly 100 has an output gas outlet 102 as well as vent gas outlet 104 and gas supply inlet 106 (see FIG. 3). Actuator assembly 200 has manual override button 202 extending outward therefrom, as further described below.

At a first end 30, pneumatic switch 10 is connected by filter gas supply inlet 22 to a compressed gas source (not shown). Filter system 20 is in turn connected at filter gas outlet 26 to gas supply inlet 106 of pilot valve assembly 100 via conduit or pipe 28. At second end 32, pneumatic switch 10 has threads 304 defined externally on waggle arm assembly housing 302 of waggle arm assembly 300 for engagement in a threaded port of a vessel defining a fluid chamber. Extending out from second end 32 is waggle arm 310 which has float 306 connected thereto at one end such that float 306 projects from the waggle arm assembly housing 302 into the fluid chamber of the vessel engaged by threads 304.

Turning now to FIGS. 2-6, pneumatic switch 10 will be described in further detail. Filter system 20 can be any suitable filter system known in the art. Generally, filter system 20 receives a compressed gas from a compressed gas source at filter gas supply inlet 22. The gas is passed through filter 24 to remove any entrained particles that might clog or otherwise adversely affect the operation of pneumatic switch 10. After passing through filter 24, the gas is passed through filter gas outlet 26 and into gas supply inlet 106 of pilot valve assembly 100. Filter gas outlet 26 and gas supply inlet 106 can be connected in fluid flow communication by any suitable method such as by a conduit or pipe 28.

Figure 3:
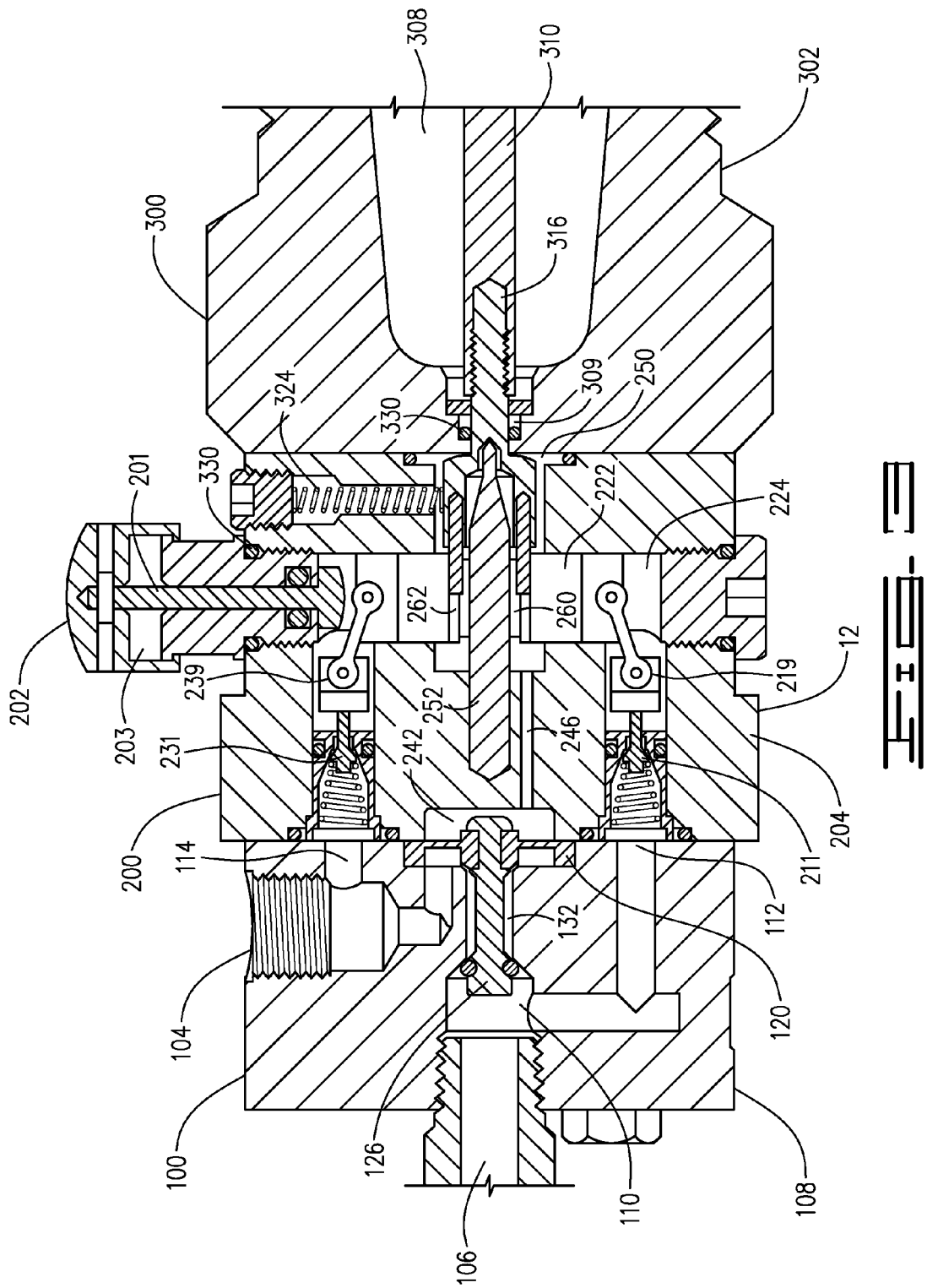
FIG. 3 is an enlargement of the central section of the cross-sectional view of FIG. 2.
Figure 4:
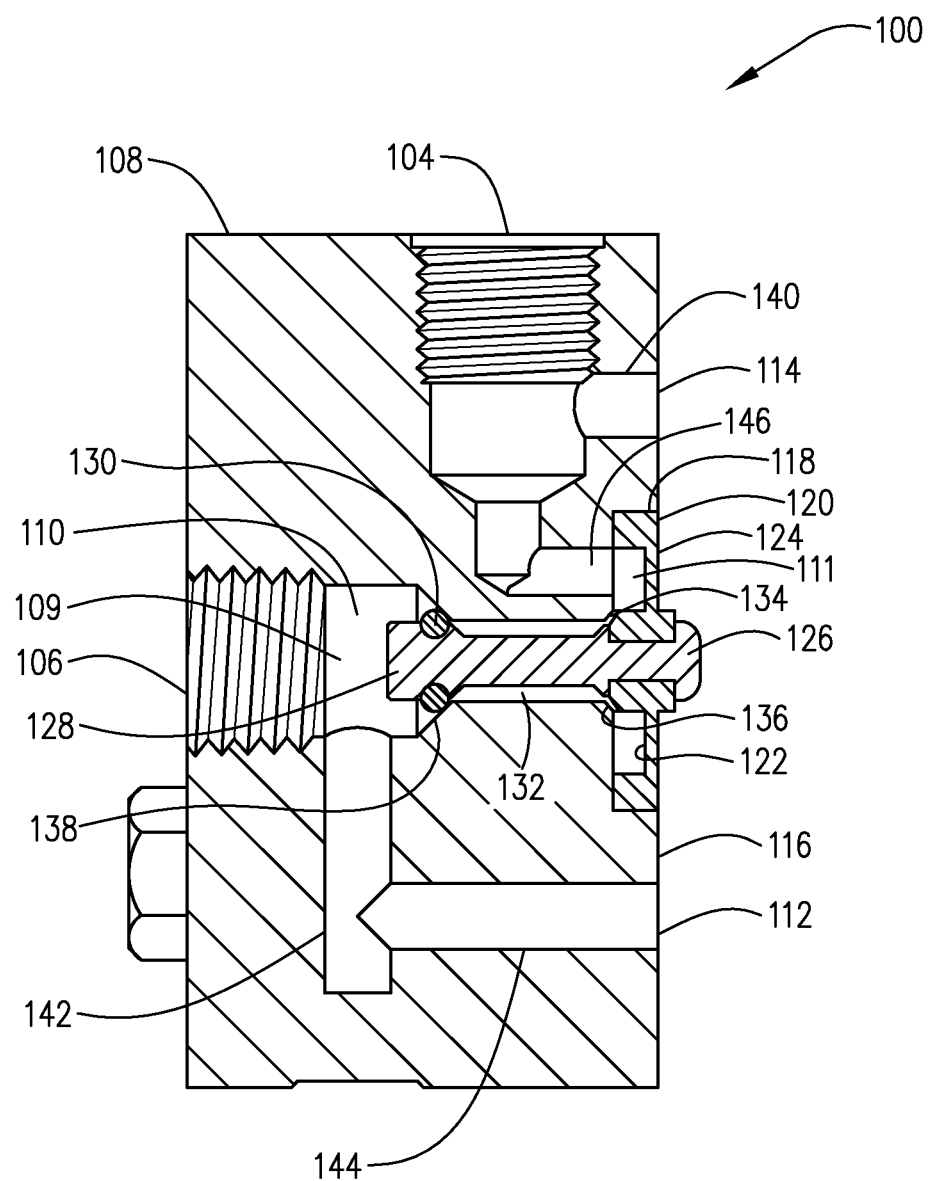
FIG. 4 is an enlargement of the cross-sectional view of FIG. 2 showing only the pilot valve assembly section.

Pilot valve assembly 100, which can best be seen from FIGS. 3 and 4, can be any suitable pilot valve design. As illustrated, pilot valve assembly 100 is a diaphragm valve. Pilot valve assembly 100 has a pilot body or housing 108, which defines output gas outlet 102 (shown in FIG. 1), vent gas outlet 104 and gas supply inlet 106. Additionally, it defines a pilot chamber 110, an actuating gas outlet 112, a vent gas inlet 114 and a set of conduits, as further described below. Vent gas inlet 114 is in fluid flow communication with vent gas outlet 104 via conduit 140. Actuating gas outlet 112 is in fluid flow communication with gas supply inlet 106 via conduits 142 and 144 and can, as shown in the figures, be in fluid flow communication with a first end portion 109 of pilot chamber 110. Pilot chamber 110 is in fluid flow communication with gas supply inlet 106 and has a second end portion 111 terminating at a first outer side 116 of the pilot body to thus form pilot port 118 in first outer side 116. Pilot chamber 110 has channel 132, which extends from first end portion 109 to second end portion 111 of pilot chamber 110. A diaphragm 120 having a first side 122 and a second side 124 is positioned across pilot port 118 so that the first side 122 of diaphragm 120 is positioned across pilot port 118 facing pilot chamber 110. Plug 126 is connected to diaphragm 120 so that it extends out from diaphragm 120 into channel 132 of pilot chamber 110. Channel 132 is in fluid flow communication with output gas outlet 102. In its first diaphragm position, or undeformed position, diaphragm 120 allows fluid flow communication between channel 132 and vent gas outlet 104 via passage 134 and conduit 146. Passage 134 is formed between diaphragm 120 and seat 136. Additionally, in this first diaphragm position, plug 126 seals channel 132 from fluid flow communication with gas supply inlet 106 by end 128 of plug 126 coming into sealing engagement with seat 138. As shown, end 128 of plug 126 can have O-ring 130 positioned so that sealing engagement is made with seat 138. In a second diaphragm position, or deformed position, diaphragm 120 is pressed inward towards channel 132. In this second position, diaphragm 120 comes into sealing engagement with seat 136, thus closing passage 134 and preventing fluid flow between channel 132 and vent gas outlet 104. Additionally, in this second diaphragm position plug 126 is moved longitudinally in channel 132 by the movement of diaphragm 120 and is disengaged from sealing contact with seat 138, thus allowing fluid flow communication between gas supply inlet 106 and channel 132 and, hence, output gas outlet 102.

Figure 5:
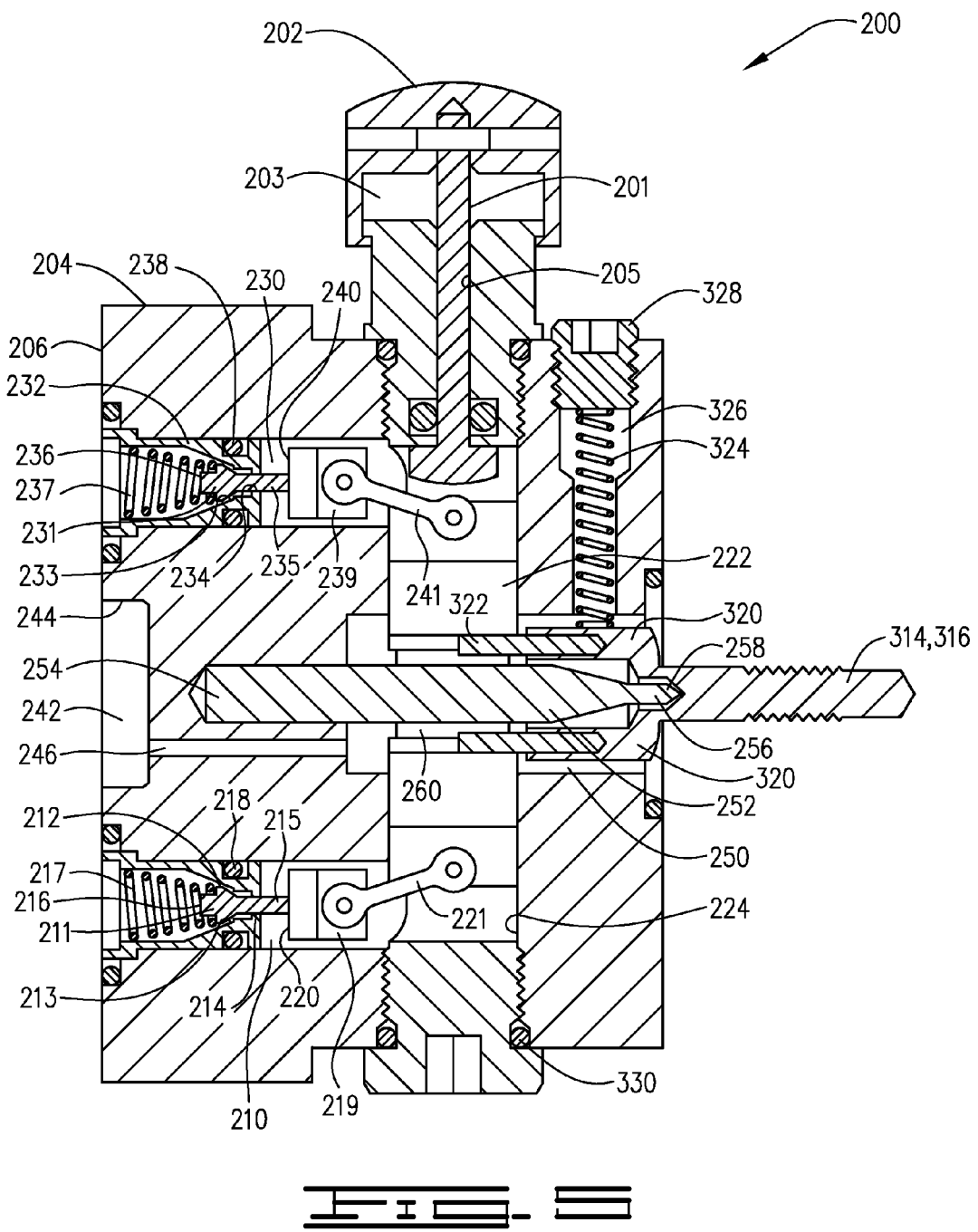
FIG. 5 is an enlargement of the cross-sectional view of FIG. 2 showing only the actuator assembly section.
Figure 11:
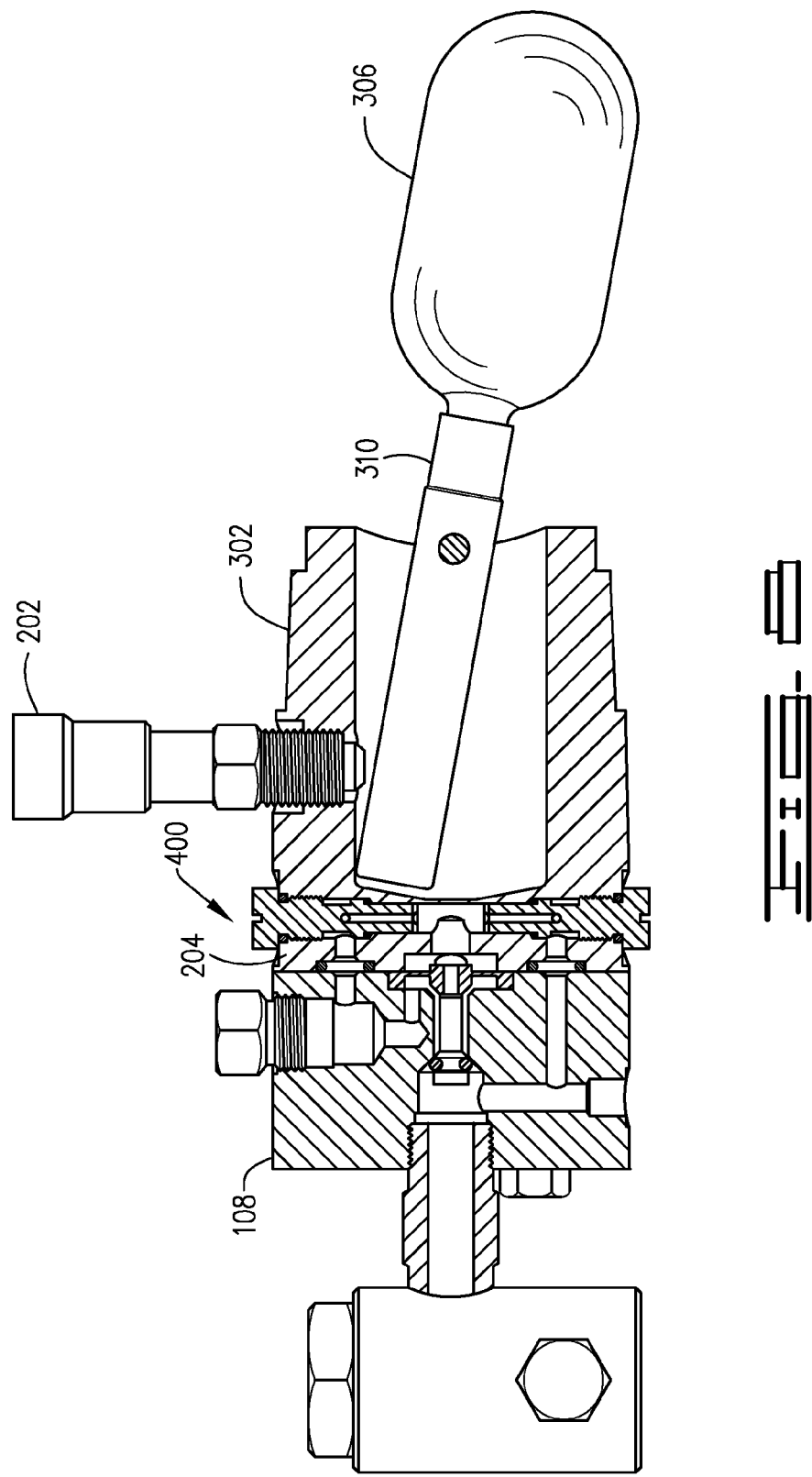
FIG. 11 is a perspective view of the embodiment of FIG. 8 illustrating the access screw to the magnet.

Actuator assembly 200, which can be best seen from FIGS. 3 and 5, has an actuator body or housing 204 which defines a gas inlet conduit 210, a bore 224 (illustrated as a vertical bore) in fluid flow communication with the gas inlet conduit 210, a vent gas conduit 230 in fluid flow communication with the bore 224, and a gas chamber 242 in fluid flow communication with the bore 224 via conduit 246. Gas chamber 242 terminates at an outer side 206 of the actuator body 204 in an actuator port 244. As can be seen from FIGS. 2 and 3, outer side 116 of pilot body 108 mates with outer side 206 of actuator body 204 such that second side 124 of diaphragm 120 is positioned across actuator port 244 and such that gas inlet conduit 210 is aligned with conduit 144 and, hence, in fluid flow communication with actuating gas outlet 112, and vent gas conduit 230 is aligned with conduit 140 and, hence, in fluid flow communication with vent gas outlet 104.

Within gas inlet conduit 210 is valve 211 comprised of valve housing 212 forming a valve seat 213, which defines aperture 214. Seal pin 215 extends through aperture 214. When valve 211 is in its closed position, seal head 216 of seal pin 215 is in sealing engagement with valve seat 213 and prevents fluid flow through gas inlet conduit 210. When valve 211 is in its open position, seal head 216 is moved away from valve seat 213 and fluid flow communication is established through gas inlet conduit 210. Spring 217 biases seal pin 215 to the closed position and O-ring 218 prevents circumvention of the valve by preventing fluid flow between the wall of gas inlet conduit 210 and valve housing 212.

Similarly, within vent gas conduit 230 is valve 231 comprised of valve housing 232 forming a valve seat 233, which defines aperture 234. Seal pin 235 extends through aperture 234. When valve 231 is in its closed position, seal head 236 of seal pin 235 is in sealing engagement with valve seat 233 and prevents fluid flow through vent gas conduit 230. When valve 231 is in its open position, seal head 236 is moved away from valve seat 233 and fluid flow communication is established through vent gas conduit 230. Spring 237 biases seal pin 235 to the closed position and O-ring 238 prevents circumvention of the valve by preventing fluid flow between the wall of vent gas conduit 230 and valve housing 232.

Valve 211 is actuated between the closed and open positions by piston 219 which is connected by piston arm 221 to slide bar 222 slidably mounted in bore 224. Valve 231 is actuated between the closed and open positions by piston 239, which is connected by piston arm 241 to slide bar 222. Pistons 219 and 239 are operationally connected to valves 211 and 231, respectively. Generally, such connection will be having the heads 220 and 240 of pistons 219 and 239 in contact but not structurally connected to seal pin 215 and 235, respectively; however the pistons can be connected to the seal pins. Accordingly, by means of pistons 219 and 239, valves 211 and 231 are operationally connected to slide bar 222 such that, when slide bar 222 is in a first position, valve 211 is in its closed position and valve 231 is in its open position and, when slide bar 222 is in a second position, valve 211 is in its open position and valve 231 is in its closed position. Additionally, the operative connection of valves 211 and 231 to slide bar 222 is such that the valves move simultaneously. It should be noted; slide bar 222 is illustrated in a neutral position, i.e. between the first position and second position; however, in operation slide bar 222 will generally be in either the first position or second position and will only be in the neutral position when moving between the first position and second position.

As indicated above, slide bar 222 is slidably mounted in bore 224 so that slide bar 222 can move between a first position and a second position. Generally, in level switching applications, bore 224 will be vertically oriented and one of the positions will be an upper position and one will be a lower position. Specifically, in the embodiment illustrated in FIGS. 2 and 3, the first position will be the upper position and the second position will be the lower position; however, for some applications it may be desirable to have valve 211 open in the first position, in which case the first position would be the lower position for such level switch applications.

Slide bar 222 can be mounted in bore 224 so as to allow the passage of gas and, hence, fluid flow communication among conduit 210, gas chamber 242 and conduit 230. To aid fluid flow communication through bore 224, slide bar 222 can have one or more channels running longitudinally along its exterior surface.

Slide bar 222 can be moved or actuated between the first position and second position by waggle arm 310, as hereinafter described, or can be moved between the first and second position by means of override button 202. Override button 202 has member 201, which extends through passage 205 in the actuator body 204. Member 201 is slidably mounted in passage 205 and can contact the top of slide bar 222 such that when override button 202 is pressed inward towards the actuator body 204, member 201 moves slide bar 222 to its second position. Generally, slide bar 222 will be biased towards its first position, as described below, and this will be sufficient to bias override button 202 outward when it is not depressed; however, if additional bias is needed, override button 202 can be biased by means of a spring, which can be located, for example, in chamber 203. Also, member 201 can be attached to the top of slide bar 222 such that pulling outward (away from the actuator body 204) moves the slide bar 222 from its second position to its first position.

Figure 2:
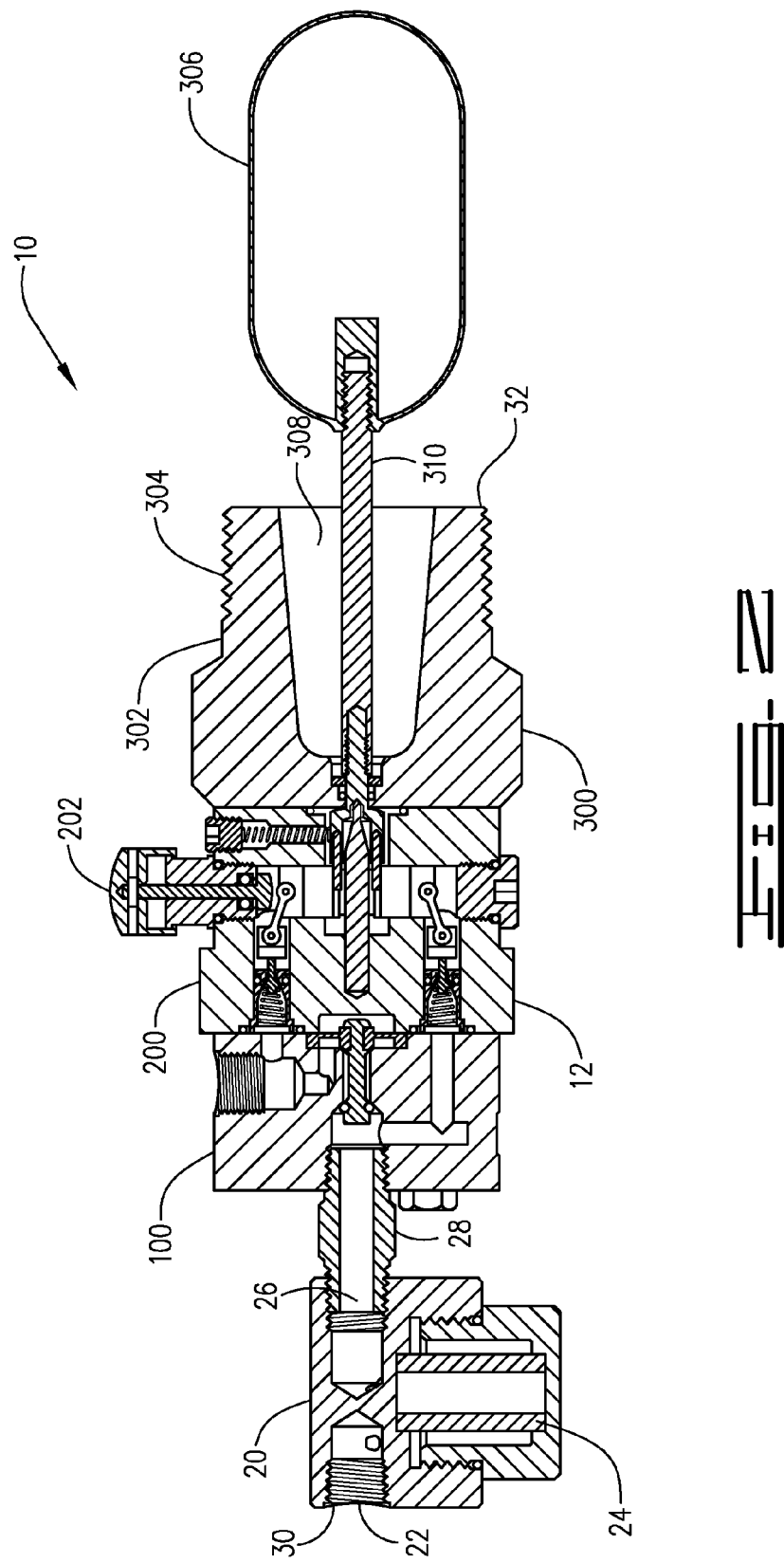
FIG. 2 is a cross-sectional view of the pneumatic switch illustrated in FIG. 1.

As can best be seen from FIGS. 2, 5 and 6, waggle arm 310 is operationally connected to slide bar 222 at a second end 314, which is at least partially located inside actuator body 204. Waggle arm 310 extends out from actuator body 204 through waggle arm chamber 308 so that a first end 312 of waggle arm 310 extends out and away from waggle arm assembly housing 302, as can be seen from FIGS. 1 and 2. Waggle arm 310 is connected to float 306 at first end 312. Generally, waggle arm assembly housing 302 will be connected to a fluids vessel (not shown) by threads 304 so that waggle arm 310 extends into the vessel. Waggle arm 310 will have a first apex position and a second apex position. In level switch applications, the first apex position corresponds to float 306 being in its lowest most positions and the second apex position corresponds to float 306 being in its uppermost position. Waggle arm 310 is operationally connected to slide bar 222 such that movement of the float from the first apex position to the second apex position moves the slide bar from its first position to its second position. Also, movement of the float from the second apex position to the first apex position moves the slide bar from its second position to its first position. For level switch applications, float 306 will move from the first apex position to the second apex position with rising fluid levels within the fluids vessel and will move from the second apex position to the first apex position with lowering fluid levels. Additionally, in level switch applications, the weight of waggle arm 310 and float 306 will bias waggle arm 310 and float 306 to the first apex position (the lowest position) and, hence, will bias slide bar 222 to the first position or upper position.

Referring now to FIGS. 5 and 6 the connection of waggle arm 310 to slide bar 222 can be seen. The second end 314 of waggle arm 310 extends through bore 309, which extends between waggle arm chamber 308 and pivot rod chamber 250. The second end 314 of waggle arm 310 terminates in a pivot piece 316 having a concave pivot dimple 318 and arms 320 ending in pins 322. Pivot rod 252 is mounted in actuator body 204 at a first end 254 and extends through an aperture 260 in slide bar 222. A second end 256 of pivot rod 252 terminates in a pivot point 258, which is in pivotal engagement with pivot piece 316 at concave pivot dimple 318. Accordingly, waggle arm 310 can pivot about pivot point 258 such that arms 320 and pins 322 move conversely to the movement of float 306; for example in level switch applications, an upward movement in float 306 results in a downward movement in arms 320 and pins 322 and a downward movement in float 306 results in an upward movement in arms 320 and pins 322. Pins 322 slidingly engage slide bar 222 such that movement of pins 322 is transferred to slide bar 222. Accordingly, slide bar 222 is moved longitudinally in bore 224 with the movement of pins 322.

A counterbalance spring 324 is positioned in counterbalance bore 326 and is in contact with one of the arms 320 to provide a preselected resistance to movement of waggle arm 310 and a counter balance to its bias towards the first apex position. The spring tension can be adjusted by adjustment of counterbalance bolt 328.

Various O-ring seals 330 are located in grooves about the pneumatic switch housing 12 so as to provide for fluid tight seals between components of the pneumatic switch. While an O-ring can be used to seal between bore 309 and waggle arm 310, in one embodiment illustrated in FIGS. 6 and 7 a boot ring or J-ring 332 is used. As can be seen from FIGS. 6 and 7, boot ring 332 has a J-shaped cross section comprising an elongated member 334, which extends longitudinally in bore 309 and engages the waggle arm, and a boot member 336, which engages transverse wall 346 and longitudinal wall 348 of bore 309. In one embodiment, boot member 336 has a transverse portion 338 and a longitudinal portion or lip portion 340 wherein transverse portion 338 engages transverse wall 346 and lip portion 340 engages longitudinal wall 348. An angle gap 342 is provided between elongated member 334 and lip portion 340 and, generally, will have an angle α of about 45° but can be from about 25° to about 75°. Accordingly, boot ring 332 provides for more sealing area between the waggle arm and the boot ring over that provided by an O-ring. Additionally, the j-shaped cross section provides less material that must be compressed for the waggle arm to move to either the first apex position or second apex position; hence, providing for better control over the resistance by counterbalance spring 324.

In operation, compressed gas, which may be air or any other suitable gas that is readily available, is introduced into filter system 20 at filter gas supply inlet 22. Typically, the gas will be introduced at a pressure above atmospheric and should be above the pressure necessary to actuate diaphragm 120 to the second diaphragm position. The gas is passed through filter 24 to remove any dirt or other particles that might adversely effect the operation of pneumatic switch 10. After being filtered, the gas is introduced into gas supply inlet 106 of pilot valve assembly 100 via filter gas outlet 26 and conduit 28; thus, compressed gas fills first end portion 109 of pilot chamber 110 on the gas supply inlet side of plug 126 and conduits 142 and 144 leading to actuating gas outlet 112.

If the pneumatic switch is being used as a pneumatic level switch for a fluids vessel and liquid has not been introduced into the fluids vessel, then pneumatic level switch 10 will be in a first position with float 306 and waggle arm 310 being at the first apex position. This means that slide bar 222 will be in its first position, valve 211 will be in its closed position and valve 231 will be in its open position allowing fluid flow communication through vent gas conduit 230. Thus, gas chamber 242 will be vented through conduit 246, bore 224 and vent gas conduit 230. As illustrated, vent gas conduit 230 vents through vent gas outlet 104 of pilot valve assembly 100 via vent gas inlet 114 and conduit 140; however, vent gas conduit 230 can be designed to vent directly out of actuator body 204.

In the first position, gas chamber 242 will generally be vented to atmospheric pressure; however, it could be vented to any pressure equal to or lower than the predetermined pressure level that actuates diaphragm 120. Because gas chamber 242 is at or below the predetermined pressure level, diaphragm 120 allows fluid flow communication between channel 132 and vent gas outlet 104 via passage 134 and conduit 146. Additionally, plug 126 seals channel 132 from fluid flow communication with gas supply inlet 106 by end 128 of plug 126 coming into sealing engagement with seat 136. Accordingly, output gas outlet 102 is not in fluid flow communication with the gas in pilot chamber 110 and compressed gas is not provided to the control component.

As liquid in the fluids vessel moves upwardly on float 306, the first end 312 of waggle arm 310 will move upwardly. Continued increase in the liquid level will move float 306 and waggle arm 310 into the second apex position. The movement of waggle arm 310 to the second apex position moves slide bar 222 into its second position; thus, opening valve 211 and closing valve 231. Opening valve 211 establishes fluid flow communication between gas supply inlet 106 and gas chamber 242 thus increasing the pressure in gas chamber 242 to above the predetermined pressure level and moving diaphragm 120 from the first diaphragm position to the second diaphragm position. In the second diaphragm position, passage 134 is closed so that gas is not vented from the process control component via the output gas outlet 102 and channel 132. Also, the movement of the diaphragm moves plug 126 longitudinally away from seat 138 and establishes fluid flow communication of the compressed gas with the process control component via channel 132 and output gas outlet 102; thus, the process control component is actuated by the compressed gas. While the illustrated device closes valve 231 in vent gas conduit 230 in this second position, optionally, a vent hole can be used in place of valve 231. The vent hole restricts the rate of venting gas from gas chamber 242 such that in the second position, gas chamber 242 remains above the predetermined pressure by constant introduction of compressed gas at a rate at least equal to the venting through the vent hole. Accordingly, the use of the vent hole maintains a constant venting through vent gas conduit 230 in the second position. This constant venting can be undesirable, especially where the venting is to the atmosphere. The use of valve 231 in vent gas conduit 230 reduces or eliminates this constant venting.

Where the process control component is a process control valve controlling the level of liquid in the vessel, the movement of the pneumatic switch to the second position can activate the process control valve to lower the liquid level. In such a case, as the liquid level lowers, the waggle arm 310 will move downward until it reaches the first apex position, which will move slide bar 222 to its first apex position thus closing valve 211 and opening valve 231. Accordingly, gas will be vented from gas chamber 242 reducing the pressure to below the predetermined pressure level and stopping fluid flow communication of the compressed gas to the process control valve.

Another embodiment of actuator assembly 400 is illustrated in FIGS. 8-11. In this embodiment, similar parts have been given the same numbers as for the previously described actuator assembly 200. Actuator assembly 400 has an actuator body or housing 204 which defines a gas inlet conduit 210, a bore 424 (illustrated as a vertical bore) in fluid flow communication with the gas inlet conduit 210, a vent gas conduit 230 in fluid flow communication with the bore 224, and a gas chamber 242 in fluid flow communication with the bore 224. Gas chamber 242 terminates at an outer side 206 of the actuator body 204 in an actuator port 244. Outer side 116 of pilot body 108 mates with outer side 206 of actuator body 204 such that second side 124 of diaphragm 120 is positioned across actuator port 244 and such that gas inlet conduit 210 is aligned with conduit 144 and, hence, in fluid flow communication with actuating gas outlet 112, and vent gas conduit 230 is aligned with conduit 140 and, hence, in fluid flow communication with vent gas outlet 104.

Slide bar 422 is slidably mounted in bore 424 so that slide bar 422 can move between a first position and a second position. Generally, in level switching applications, bore 424 will be vertically oriented and one of the positions will be an upper position and one will be a lower position. Specifically, in the embodiment illustrated, the first position will be the upper position and the second position will be the lower position; however, other arrangements are within the scope of the invention.

Adjacent to a first end 418 of slide bar 422 is first seat 412 and adjacent to a second end 419 of slide bar 422 is second seat 414. First seat 412 defines at least a portion of vent gas conduit 230 and second seat 414 defines at least a portion of gas inlet conduit 210. Slide bar 422 and seats 412 and 414 are constructed of a ferromagnetic material. Slide bar 422 can be moved or actuated between the first position and second position by waggle arm 310, which here, incorporates magnet 415 internally. Magnet 415 can be removed for cleaning, replacement and other purposes by removal of set screw 416, which can also be connected to a float 306. The slide bar 422 interacts magnetically with the first seat 412 and second seat 414 and with magnet 415 in waggle arm 310 such that slide bar 422 is actuated between the first position and the second position by the movement of the magnet 415 in waggle arm 310. The movement of slide bar 422 is by operation of magnetic forces. Generally, the movement of slide bar 422 will be in opposition to the movement of the magnet 415 so that, when magnet 415 moves upward, slide bar 422 is magnetically moved downward and, when magnet 415 moves downward, slide bar 422 magnetically moves upward. As will be appreciated, this means that slide bar 422 can be completely sealed from waggle arm assembly housing 302 and from any fluids operating on waggle arm 310. Additionally, in this embodiment override button 202 is moved to waggle arm assembly housing 302 and operates by moving waggle arm 310. It will be appreciated that in this embodiment, arm 310 now pivots about axis 430, which is located within waggle arm assembly housing 302. Generally, override button 202 will be now located between axis 430 and the junction of waggle arm assembly housing 302 and actuator housing 204.

First end 418 of slide bar 422 and first end 420 of seat 412 are in contact when slide bar 422 is in the first position and are machined to seal, thus forming a valve. Second end 419 of slide bar 422 and first end 421 of seat 414 are in contact when slide bar 422 is in the second position and are machined to seal, thus forming a valve. Thus, when float 306 is in its first apex position, slide bar 422 is in a first position, gas inlet conduit 210 is closed to fluid flow and vent gas conduit 230 is open to fluid flow. When float 306 is at its second apex position, slide bar 422 is in a second position, gas inlet conduit 210 is open to fluid flow and vent gas conduit 230 is closed to fluid flow. When open to fluid flow, conduit 210 is in fluid flow communication with gas chamber 242 by fluid flow around slide bar 422, which can be facilitated by channels or grooves 426 in the exterior surface 428 of the body portion of slide bar 422; that is, extending from first end 418 to second end 419 but not interfering with the seal made with either vent gas conduit 230 or gas inlet conduit 210. Similarly, when open to fluid flow, conduit 230 is in fluid flow communication with gas chamber 242 by fluid flow around slide bar 422, which can be facilitated by channels 426.

Figure 8:
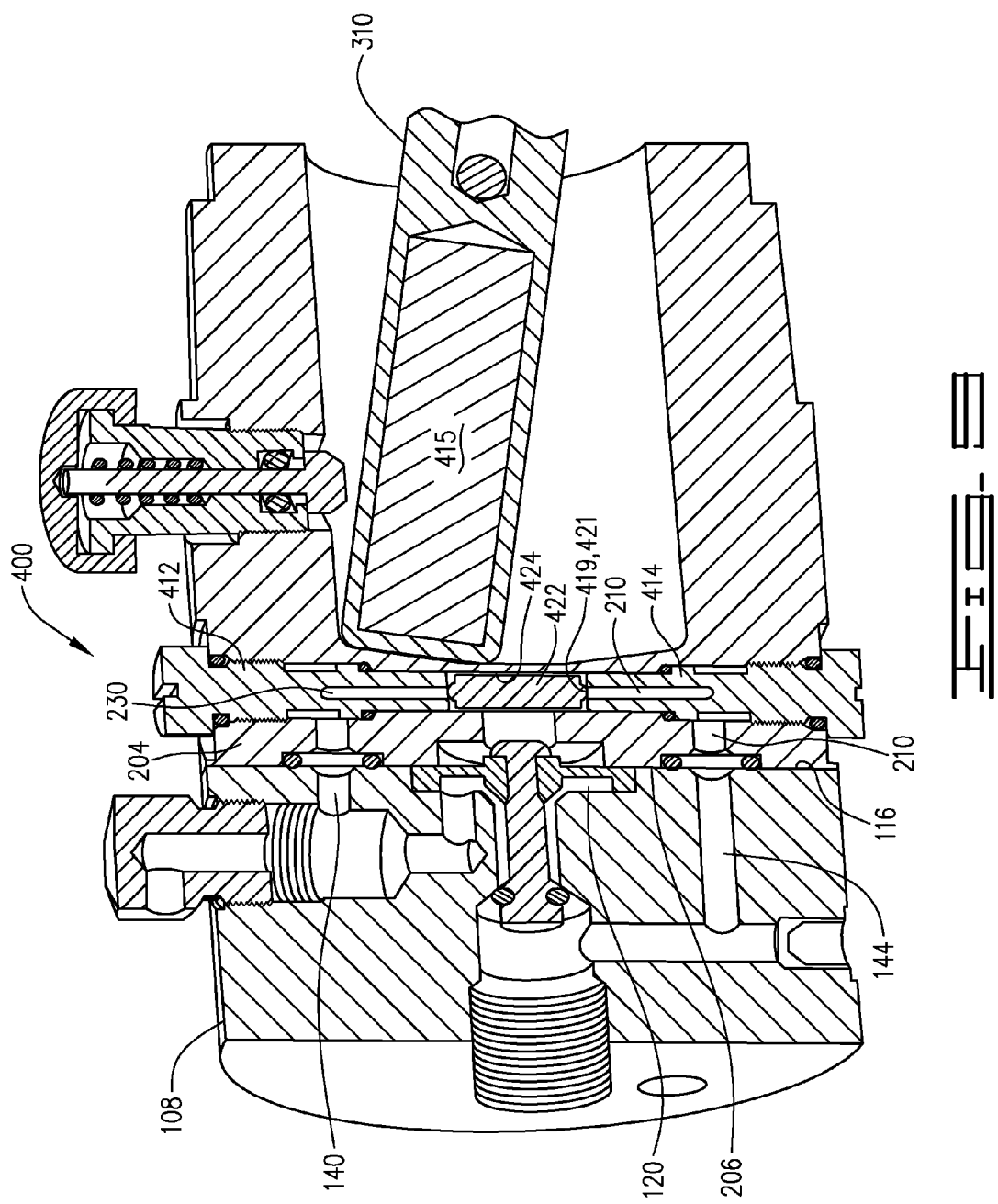
FIG. 8 is a cross-sectional view of a pneumatic switch in accordance with another embodiment of the invention.

As can be seen from FIGS. 8-10 and understood from the above disclosure, slide bar 422 can be a solid magnetic bar, which is generally in the form of a cylinder having channels 426 extending from first end 418 to second end 419. Additionally, slide bar 422 can have nub or dome portion 432 on its first end 418 and nub or dome portion 434 on its second end 419. Nub 432 will generally be of a size and shape to partially enter into and to form a seal with vent gas conduit 230 at first end 420. Nub 434 will generally be of a size and shape to partially enter into and to form a seal with gas inlet conduit 210 at first end 421.

In accordance with the above description further embodiments will now be described. In one exemplary embodiment there is provided a pneumatic switch comprising a diaphragm valve, a switch assembly, a slide bar, a first gas conduit, a first valve, a second gas conduit, and a second valve. The diaphragm valve is actuated when the pressure in a gas chamber exceeds a predetermined pressure level. The switch assembly is moveable from a first apex position to a second apex position. The slide bar is operationally connected to the switch assembly such that movement of the switch assembly from the first apex position to the second apex position moves the slide bar between a first position to a second position. The first valve is associated with the first gas conduit. The first valve has an open position that allows fluid flow through the first gas conduit and a closed position that prevents fluid flow through the first gas conduit so that, when the first valve is in the open position, the first gas conduit is in fluid flow communication with a gas source and the gas chamber such that the first gas conduit receives pressurized gas at a pressure above the predetermined pressure level from the gas source and introduces the pressurized gas into the gas chamber to thus actuate the diaphragm valve. The second valve is associated with the second gas conduit. The second valve has an open position that allows fluid flow through the second gas conduit and a closed position that prevents fluid flow through the second gas conduit so that, when the second valve is in the open position, the second gas conduit is in fluid flow communication with the gas chamber and vents the gas from the gas chamber such that the pressure in the gas chamber is below the predetermined pressure level. The first valve and second valve are operationally connected to the slide bar such that when the slide bar is in the first position the first valve is in the closed position and the second valve is in the open position and when the slide bar is in the second position the first valve is in the open position and the second valve is in the closed position.

The pneumatic switch can further comprise a first piston and a second piston. The first piston can be operationally connected to the first valve and the slide bar such that moving the slide bar to the second position moves the first valve to the open position by means of the first piston. The second piston can be operationally connected to the second valve and the slide bar such that moving the slide bar to the first position moves the second valve to the open position by means of the second piston.

The slide bar can have a first end, a second end, an exterior surface and a groove in said exterior surface extending from said first end to said second end wherein the groove is in fluid flow contact with the gas chamber. In a further embodiment of the pneumatic switch the first valve can be formed from the first end of the slide bar and a first seat, which defines at least a portion of said first gas conduit, and said second valve is formed from a second end of the slide bar and a second seat, which defines at least a portion of the second gas conduit. Additionally, the slide bar can be magnetic.

The switch assembly can comprise a waggle arm having a first end and a second end, a float connected to the first end of the waggle arm, wherein the second end of the waggle arm is operationally connected to the slide bar and wherein the float moves from the first apex position to the second apex position with rising fluid level in a tank such that the second end of the waggle arm moves the slide bar from the first position to the second position. Further, where the slide bar is magnetic, the second end of the waggle arm can be magnetic such that said waggle arm interacts magnetically with said slide bar to move said slide bar from the first position to the second position.

Also, the pneumatic switch can comprise a manual override button. The manual override button can be operationally connected to the slide bar such that moving the manual override button moves the slide bar between the first position and second position. Alternatively, the manual override button can be operationally connected to the waggle arm such that moving the manual override button moves the waggle arm between the first apex position and second apex position.

The diaphragm valve can comprise a gas supply inlet, an output gas outlet, a vent gas outlet and a diaphragm. When the diaphragm valve is actuated, the diaphragm moves from a first diaphragm position to a second diaphragm position. In the first diaphragm position, the output gas outlet is in fluid flow communication with the vent gas outlet and not in fluid flow communication with the gas supply inlet. In the second position, the output gas outlet is in fluid flow communication with the gas supply inlet and not in fluid flow communication with the vent gas outlet.

In another embodiment there is provided a pneumatic level switch comprising a pilot valve, an actuator body, a slide bar, a first valve and a second valve. The pilot valve assembly has a gas supply inlet, an output gas outlet, a vent gas outlet. The pilot valve has a first position in which the gas supply inlet is not in fluid flow communication with the gas supply outlet and the vent gas outlet is in fluid flow communication with the gas supply outlet. Also, the pilot valve has a second position in which the gas supply inlet is in fluid flow communication with the gas supply outlet and the gas supply outlet is not in fluid flow communication with the vent gas outlet. The actuator body defines a gas inlet conduit, a bore in fluid flow communication with the gas inlet conduit, a vent gas conduit in fluid flow communication with the bore, and a gas chamber terminating at a first outer side of the actuator body in an actuator port. The gas chamber is in fluid flow communication with the bore. The actuator body and pilot valve assembly are connected such that supplying the gas chamber with a gas above a predetermined pressure level activates the pilot valve assembly to change from the first position to the second position. The slide bar is slidably disposed in the bore and moveable from a first position to a second position. The first valve is disposed in the gas inlet conduit and has a closed position preventing fluid flow through the gas inlet conduit and an open position allowing fluid flow through the gas inlet conduit. The second valve is disposed in the vent gas conduit and has a closed position preventing fluid flow through the vent gas conduit and an open position allowing fluid flow through the vent gas conduit.

The pneumatic level switch can further comprise a first piston. The first piston is operationally connected to the slide bar and the first valve such that, when the slide bar is in the first position, the first valve is in the closed position and, when the slide bar is in the second position, the first valve is in the open position. Also, the pneumatic level switch can comprise a second piston. The second piston is operationally connected to the slide bar and the second valve such that, when the slide bar is in the first position, the first valve is in the closed position and the second valve is in the open position and, when the slide bar is in the second position, the first valve is in the open position and the second valve is in the closed position.

The slide bar can have a first end, a second end, an exterior surface and a groove in said exterior surface extending from said first end to said second end. The groove is in fluid flow contact with the gas chamber. The first valve can be formed from a first end of said slide bar and a first seat, which defines at least a portion of the first gas conduit. The second valve can be formed from a second end of said slide bar and a second seat, which defines at least a portion of the second gas conduit. Further, the slide bar can be magnetic.

The pneumatic switch can further comprise a float operationally connected to the slide bar such that movement of the float results in movement of the slide bar. The float can be connected to a waggle arm which is operationally connected the slide bar. The waggle arm can have a first end and a second end. The float can be connected to the first end of the waggle arm. The float can move from a first apex position to a second apex position with rising fluid level in a tank. If the slide bar is magnetic, the second end of said waggle arm can be magnetic such that the waggle arm interacts magnetically with the slide bar such that movement of the float from the first apex position to the second apex position moves the slide bar between a first position to a second position.

In yet a further embodiment, the second end of the waggle arm can terminate in a pivot piece having a pin. The waggle arm extends through an aperture in the actuator body so that the pin extends into the bore and is in sliding engagement with the slide bar. A pivot rod can be fixedly secured in the actuator body and has a pivot end in pivotal engagement with the pivot piece. The float moving from the first apex position to the second apex position with rising fluid level in a tank causes the waggle arm to pivot about the pivot end of the pivot rod so that the pin moves the slide bar. The pneumatic level switch can further comprise a boot seal having a j-shaped cross section. The boot seal can comprise an elongated member ending in a lip. The elongated member engages the waggle arm and the boot seal provides a fluid tight seal such that fluid is not communicated through the aperture of the actuator body.

In one embodiment, the pilot valve assembly of the pneumatic float switch comprises a pilot body, a diaphragm and a plug. The pilot body defines the gas supply inlet, the output gas outlet, the vent gas outlet, and a pilot chamber terminating at a first outer side of the pilot body to thus form a pilot port in the first outer side. The diaphragm has a first side and a second side. The pilot valve assembly and actuator body are connected so that the first side is positioned across the pilot port and the second side is positioned across the actuator port. The plug is connected to the diaphragm. The plug and diaphragm are configured such that, when the pilot valve assembly is in the first position, they stop fluid flow from the gas supply inlet to the output gas outlet and allow fluid flow from the output gas outlet to the vent gas outlet and, when the pilot valve assembly is in the second position, they stop fluid flow from the output gas outlet to the vent gas outlet and allow fluid flow from the gas supply inlet to the output gas outlet. In a further embodiment, when the pilot valve assembly is in the second position, the output gas outlet receives the gas above the predetermined pressure level from the supply gas inlet and provides the gas to a process control component through the output gas outlet.

Further, the pilot body can define an actuating gas outlet, which is in fluid flow communication with the gas supply inlet conduit of the pilot valve assembly and the gas inlet conduit of the actuator body such that, when the first valve is open, the actuating gas outlet receives the gas from the gas supply inlet and supplies it to the gas inlet conduit which supplies it to the gas chamber. The pilot body can further define a vent gas inlet, which is in fluid flow communication with the vent gas outlet of the pilot valve assembly and with the vent gas conduit of the actuator body.

In another embodiment there is a process for providing output gas to a process control component in response to a change of fluid level in a tank from a first level to a second level, the process comprising:
(a) introducing a gas at a pressure above a predetermined pressure level into a diaphragm valve;
(b) moving a slide bar from an initial position to a secondary position in response to the fluid level in the tank changing from the first level to the second level;
(c) moving a first valve from a closed position to an open position in response to the movement of the slide bar in step (b);
(d) moving a second valve from an open position to a closed position in response to the movement of the slide bar in step (b) wherein the second valve and first valve are moved simultaneously; and
(e) actuating a diaphragm valve in response to steps (c) and (d) such that the gas is provided to the process control component.

In the process, the diaphragm valve can be actuated when the pressure in a gas chamber exceeds the predetermined pressure level and step (c) of the process can further comprise introducing a portion of the gas from the diaphragm valve to the gas chamber though the first valve.

The process can further comprise:
(f) moving the slide bar from the secondary position to the initial position in response to the fluid level in the tank changing from the second level to the first level;
(g) moving the first valve from the open position to the closed position in response to the movement of the slide bar in step (f);
(h) moving the second valve from the closed position to the open position in response to the movement of the slide bar in step (f) wherein the second valve and first valve are moved simultaneously; and
(e) venting the gas from the gas chamber in response to steps (g) and (h) such that the pressure in the gas chamber does not exceed the predetermined pressure level.

While the process of the current invention has been described with respect to maintaining a liquid below a predefined level in the vessel, other embodiments, such as use of the pneumatic switch to maintain the liquid level above a predefined level, will be readily apparent to one skilled in the art from the above description. Additionally, other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. A pneumatic switch comprising:
   a diaphragm valve, which is actuated when the pressure in a gas chamber exceeds a predetermined pressure level;
   a switch assembly moveable from a first apex position to a second apex position;
   a slide bar operationally connected to the switch assembly such that movement of the switch assembly from the first apex position to the second apex position moves the slide bar between a first position to a second position;
   a first gas conduit;
   a first valve associated with the first gas conduit wherein the first valve has an open position that allows fluid flow through the first gas conduit and a closed position that prevents fluid flow through the first gas conduit so that, when the first valve is in the open position, the first gas conduit is in fluid flow communication with a gas source and the gas chamber such that the first gas conduit receives pressurized gas at a pressure above the predetermined pressure level from the gas source and introduces the pressurized gas into the gas chamber to thus actuate the diaphragm valve;
   a second gas conduit; and
   a second valve associated with the second gas conduit wherein the second valve has an open position that allows fluid flow through the second gas conduit and a closed position that prevents fluid flow through the second gas conduit so that, when the second valve is in the open position, the second gas conduit is in fluid flow communication with the gas chamber and vents the gas from the gas chamber such that the pressure in the gas chamber is below the predetermined pressure level; wherein said first valve is formed from a first end of said slide bar and a first seat, which defines at least a portion of said first gas conduit, and said second valve is formed from a second end of said slide bar and a second seat, which defines at least a portion of said second gas conduit; and wherein the first valve and second valve are operationally connected to the slide bar such that when the slide bar is in the first position the first valve is in the closed position and the second valve is in the open position and when the slide bar is in the second position the first valve is in the open position and the second valve is in the closed position.

2. The pneumatic switch of claim 1 wherein said slide bar has an exterior surface and a groove in said exterior surface extending from said first end to said second end wherein the groove is in fluid flow contact with the gas chamber.

3. The pneumatic switch of claim 1 wherein said slide bar is magnetic.

4. The pneumatic switch of claim 1 further comprising a manual override button operationally connected to the slide bar such that moving the manual override button moves the slide bar.

5. The pneumatic switch of claim 1 wherein the switch assembly comprises a waggle arm having a first end and a second end, a float connected to the first end of the waggle arm, wherein the second end of the waggle arm is operationally connected to the slide bar and wherein the float moves from the first apex position to the second apex position with rising fluid level in a tank such that the second end of the waggle arm moves the slide bar from the first position to the second position.

6. The pneumatic switch of claim 5 wherein said slide bar comprises a magnetic rod having an exterior surface and a groove in said exterior surface extending from said first end to said second end wherein the groove is in fluid flow contact with the gas chamber.

7. The pneumatic switch of claim 6 wherein said slide bar is magnetic and said second end of said waggle arm is magnetic such that said waggle arm interacts magnetically with said slide bar to move said slide bar from the first position to the second position.

8. The pneumatic switch of claim 7 further comprising a manual override button operationally connected to the waggle arm such that the waggle arm can be moved between the first apex position and second apex position by moving the manual override button.

9. The pneumatic switch of claim 1 wherein the diaphragm valve comprises:
   a gas supply inlet;
   an output gas outlet;
   a vent gas outlet; and
   a diaphragm which when the diaphragm valve is actuated moves from a first diaphragm position to a second diaphragm position and wherein in the first diaphragm position the output gas outlet is in fluid flow communication with the vent gas outlet and not in fluid flow communication with the gas supply inlet and in the second position the output gas outlet is in fluid flow communication with the gas supply inlet and not in fluid flow communication with the vent gas outlet.

10. The pneumatic switch of claim 1 further comprising:
   a waggle arm having a first end and a second end and a float connected to the first end of the waggle arm, wherein the float moves from the first apex position to the second apex position with rising fluid level in a tank; and wherein said slide bar is magnetic and said second end of said waggle arm is magnetic such that said waggle arm interacts magnetically with said slide bar such that movement of the float from the first apex position to the second apex position moves the slide bar between a first position to a second position; and
   a manual override button operationally connected to the slide bar such that moving the manual override button moves the slide bar and moves the waggle arm; and
   wherein said slide bar comprises an exterior surface and a groove in said exterior surface extending from said first end to said second end wherein the groove is in fluid flow contact with the gas chamber; and
   wherein said diaphragm valve has:
      a gas supply inlet;
      an output gas outlet;
      a vent gas outlet; and
      a diaphragm which is actuated when the pressure in a gas chamber exceeds a predetermined pressure level and when actuated moves from a first diaphragm position to a second diaphragm position and wherein in the first diaphragm position the output gas outlet is in fluid flow communication with the vent gas outlet and not in fluid flow communication with the gas supply inlet and in the second position the output gas outlet is in fluid flow communication with the gas supply inlet and not in fluid flow communication with the vent gas outlet.

11. The pneumatic level switch of claim 1 further comprising an actuator assembly having an interior, an exterior and a waggle arm extending from the interior of the actuator assembly to the exterior of the actuator assembly, and
   a boot seal having a j-shaped cross section comprising an elongated member ending in a lip wherein the elongated member engages the waggle arm and the boot seal provides a fluid tight seal between the interior and the exterior of the actuator assembly.

12. The pneumatic level switch of claim 11 further comprising:
   a slide bar slidably disposed in a bore in the interior of the actuator assembly and moveable from a first position to a second position; and wherein the waggle arm has a first end exterior to the actuator assembly and a second end in the interior of the actuator assembly and wherein the waggle arm terminates at the second end in a pivot piece pivotal about a pivot point and having a pin so that the pin extends into the bore and is in sliding engagement with the slide bar, such that when the waggle arm is moved from a first apex position to a second apex position, the pins then move the slide bar from the first position to the second position.

13. The pneumatic level switch of claim 12 further comprising an override button connected to the slide bar such that movement of the button results in movement of the slide bar and waggle arm.

14. A pneumatic level switch comprising:
   a pilot valve assembly having a gas supply inlet, an output gas outlet, a vent gas outlet, a first position in which the gas supply inlet is not in fluid flow communication with the gas supply outlet and the vent gas outlet is in fluid flow communication with the gas supply outlet, and a second position in which the gas supply inlet is in fluid flow communication with the gas supply outlet and the gas supply outlet is not in fluid flow communication with the vent gas outlet;
   an actuator body defining a gas inlet conduit, a bore in fluid flow communication with the gas inlet conduit, a vent gas conduit in fluid flow communication with the bore, and a gas chamber terminating at a first outer side of the actuator body in an actuator port and wherein the gas chamber is in fluid flow communication with the bore, wherein the actuator body and pilot valve assembly are connected such that supplying the gas chamber with a gas above a predetermined pressure level activates the pilot valve assembly to change from the first position to the second position;
   a slide bar slidably disposed in the bore and moveable from a first position to a second position;
   a first valve disposed in the gas inlet conduit and having a closed position preventing fluid flow through the gas inlet conduit and an open position allowing fluid flow through the gas inlet conduit; and
   a second valve disposed in the vent gas conduit and having a closed position preventing fluid flow through the vent gas conduit and an open position allowing fluid flow through the vent gas conduit.

15. The pneumatic level switch of claim 14 further comprising:
   a first piston operationally connected to the slide bar and the first valve such that, when the slide bar is in the first position, the first valve is in the closed position and, when the slide bar is in the second position, the first valve is in the open position;
   a second piston operationally connected to the slide bar and the second valve such that, when the slide bar is in the first position, the first valve is in the closed position and the second valve is in the open position and, when the slide bar is in the second position, the first valve is in the open position and the second valve is in the closed position.

16. The pneumatic level switch of claim 14 wherein said slide bar has a first end, a second end, an exterior surface and a groove in said exterior surface extending from said first end to said second end wherein the groove is in fluid flow contact with the gas chamber.

17. The pneumatic level switch of claim 16 wherein said first valve is formed from a first end of said slide bar and a first seat, which defines at least a portion of said first gas conduit, and said second valve is formed from a second end of said slide bar and a second seat, which defines at least a portion of said second gas conduit.

18. The pneumatic level switch of claim 14 wherein said slide bar is magnetic and said pneumatic switch further comprises a waggle arm having a first end and a second end and a float connected to the first end of the waggle arm, wherein the float moves from a first apex position to a second apex position with rising fluid level in a tank; and wherein said second end of said waggle arm is magnetic such that said waggle arm interacts magnetically with said slide bar such that movement of the float from the first apex position to the second apex position moves the slide bar from a first position to a second position.

* * * * *